United States Patent [19]

Simonton et al.

[11] Patent Number: 4,679,316
[45] Date of Patent: Jul. 14, 1987

[54] APPARATUS FOR FORMING AND INSERTING CELL SEPARATOR BASKETS

[75] Inventors: Robert D. Simonton, Fremont; John D. Cattano, Castalia; Robert K. Mason, Gibsonburg, all of Ohio

[73] Assignee: Fremont Special Machine Co., Inc., Fremont, Ohio

[21] Appl. No.: 859,691

[22] Filed: May 5, 1986

Related U.S. Application Data

[62] Division of Ser. No. 707,887, Mar. 4, 1985, Pat. No. 4,618,546.

[51] Int. Cl.[4] .................. H01M 2/00; B23P 19/00
[52] U.S. Cl. .................... 29/731; 29/623.3; 156/204; 156/292; 156/461
[58] Field of Search ............. 29/731, 623.3, 623.4; 156/204, 292, 461, 443

[56] References Cited

U.S. PATENT DOCUMENTS

3,013,100 12/1961 Mendelsohn et al. ............ 29/623.4
4,012,268 3/1977 Johnsen ........................... 156/204

Primary Examiner—Donald L. Walton
Attorney, Agent, or Firm—David H. Wilson

[57] ABSTRACT

A primary cell separator basket is formed from sheet material folded upon itself to form a basket bottom at the fold and bonded along margins in face to face contact extending from the fold. One or both sheet faces between the bonded margins are crowned outwardly to preform the basket and open its top. Basket preforms can be made in strips by longitudinally folding strip sheet material, crowning the material at intervals along the strip length and bonding the material in face to face relationship transverse of the strip length along the strip length in regions which fall between the crowns. Apparatus and methods of forming are disclosed for forming baskets and basket strips and for final forming and inserting baskets into primary cell subassemblies, including means to compress bonded margins toward each other to spread the crowned region, means to sever preformed baskets from strips of the preforms, means to insert a mandrel into a preform for forming a cylindrical basket, folding the bonded margins along the basket walls in a forming die, and advancing the mandrel mounted basket into a cell subassembly.

20 Claims, 13 Drawing Figures

APPARATUS FOR FORMING AND INSERTING CELL SEPARATOR BASKETS

This is a division of application Ser. No. 707,887 filed Mar. 4, 1985 now U.S. Pat. No. 4,618,546 and entitled "Cell Separator Basket and Method of and Apparatus for Forming and Inserting Same".

This invention relates to cell separator baskets as employed in primary cells and to the method of and apparatus for forming such baskets and inserting them in a partially fabricated cell.

Primary cells having cylindrical shaped elements have separator membranes of tubular shape for physically separating the anode and cathode while permitting ionic flow therethrough. Such separators are fabricated from materials which resist chemical attack by the compositions within the cell, are mechanically stable for battery fabrication, and can be economically fabricated into suitable structures. Typically, thin sheets of ionically permeable, thermoplastic material such as polyethylene and polypropylene are employed and they may be combined with fibrous material or laminated with fibrous felted sheets of absorbent material for the retention of electrolyte particularly on the surface adjacent the cell cathode.

Separator structures in the form of wound tubes of sheet material have been formed with suitable bonds at the overlapping junction of the sheet. Fabrication and handling of such tubes, particularly in the smaller size cells has been a difficult and expensive aspect of cell manufacture.

Another form of separator basket as disclosed in Carmichael et al. Canadian Pat. No. 730,237 issued May 15, 1966 and entitled "Separator for Galvanic Cells" has been formed by two U shaped strips of separator material positioned in quadrature around their axes between their arms such that the width of the strips of material overlap when inserted in a cell structure to enclose an electrode of the cell to insure separation of the anode from the cathode and elements in conductive contact with the anode and cathode. The separator is supplied as rectangular sheet blanks to overlay an open top die cavity through which they are advanced into a cell container beneath the open bottom of the die cavity by a punch. The quadrature relationship of the unbonded side seams of each blank is obtained by rotating the die and container 90 degrees around their axes from the position in which the first blank is inserted prior to the insertion of the second blank.

Lipari U.S. Pat. No. 4,410,383 of Oct. 18, 1983 for "Method for the Manufacture of Thermoplastic Tubular Members" discloses a method of and apparatus for fabricating separator membranes for use in alkaline electrochemical cells from two thin sheets of ionically permeable thermoplastic overlaid upon each other as strip stock and impulse heat sealed to each other longitudinally of the strips. A continuous process is disclosed where the strip stock is conveyed along a path through apparatus having two or more welding anvils operating in conjunction with an ultrasonic welding head and spaced apart perpendicular to the path to form continuous spaced apart seams parallel to the conveying direction of the strip. The strip is cut at the seam so that the sheets remain joined on each side of the cut, preferably by simultaneously cutting and welding. The tubes thus formed are cut to any suitable length for further fabrication as cell separators.

The present invention forms closed end tubes or baskets by folding a single strip of separator sheet material longitudinally, bonding the facing surfaces of the folded sides of the strip together transversely of the strip at intervals spaced longitudinal of the strip, and ultimately severing the strip transversely at or adjacent the spaced bonds to provide partially formed separator baskets with a closed bottom at the fold and closed sides along the bond fins formed by the joined overlaying strip sides. Bond spacing for each basket is one half the desired perimeter of the separator basket to be formed and advantageously can be accomplished by a bifurcated welding head having its operating faces and cooperating anvils at the desired spacing longitudinal of the strip and of a length transverse of the strip equal to or exceeding the length of the basket, advantageously the folded strip width.

While separator baskets can be cut from the strip at or adjacent the welding heads, an enhanced handling and forming of the basket is achieved by maintaining the strip with the partially formed baskets integral for feeding to the final forming station for insertion in a cell subassembly. The strip form of separator baskets can be an intermediate product and as such conveniently is wound in a coil for storage, shipment or feeding to the equipment in which the separator baskets are utilized. Alternatively it can be fed in line from its forming mechanism to the apparatus for final forming and insertion of the separator baskets into primary cells.

The utilization equipment can comprise an uncoiling station-supplying the separator basket strip to a feeder which introduces the strip with the partially formed baskets to a gripping mechanism and properly indexed to a cut off which severs individual baskets from the strip. The severed and partially formed baskets are opened at their open ends and a mandrel introduced into the open end. The mandrel further opens the basket and carries it to an edge forming tool which folds the bond overlapped and fused fins against the basket sides. Advance of the mandrel through the edge forming tool and into a cavity such as the partially fabricated primary cell which will utilize the basket separator forms the end of the separator to the cavity contour. Withdrawal of the mandrel deposits the separator in the cavity since it is engaged and retained by the cavity walls.

In accordance with the above features it is an object of this invention to improve primary cell separators.

Other objects are to increase the speed of manufacture, simplify the handling, and reduce the ultimate cost of primary cell separators and the cells in which they are employed.

The above and additional features and objects of the present invention will be appreciated more fully from the following detailed description when read with reference to the accompanying drawings in which.

Figure 1:
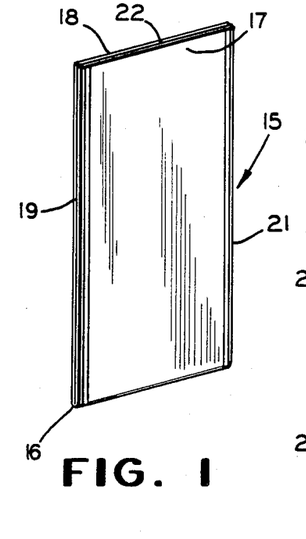
FIG. 1 is a perspective view of a folded and bonded separator basket preform before it is opened according to one aspect of this invention.

One form of a separator basket preform 15 made up of a sheet of separator material folded upon itself at fold 16 as a front wall 17 and rear wall 18 is shown in FIG. 1. The overlaid edges of walls 17 and 18 extending from fold 16 are bonded in face to face relationship as by ultrasonically welding to form bond fins 19 and 21 while the sides of the overlaid walls 17 and 18 opposite fold 16 are left unbonded at 22 so that they can be opened to receive elements of the cell.

Figures 2, 3:
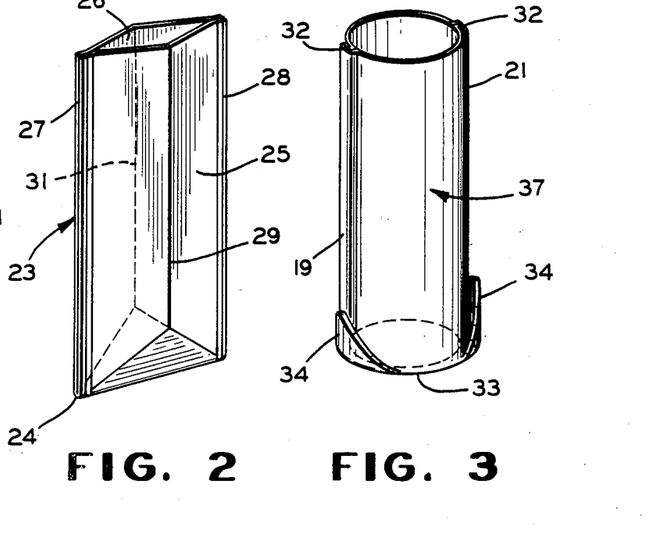
FIG. 2 is a perspective view of another form of a folded and bonded separator basket preform which is partially preformed to open its end according to another aspect of this invention.
FIG. 3 is a perspective view of a formed separator basket as derived from the folded and bonded units of FIGS. 1 or 2; illustrating the form of the basket within a primary cell.

Another form of separator basket preform 23 is shown in FIG. 2. It includes a bottom fold 24 of the sheet from which it is formed and front and rear walls 25 and 26 bonded along their sides 27 and 28 as in FIG. 1. However the front and rear walls are spaced to facilitate the forming of the basket. Spacing of the front and rear walls 25 and 26 between their bonded sides is achieved by creasing the folded material along the central region of each wall to form crown 29 and 31.

In the completed form the separator basket is of generally circular cross section and is adapted to be fitted within a right circular cylindrical cavity as will be described. The bond fins 19 and 21 or 27 and 28 are folded against the adjacent basket wall as at 32 in FIG. 3 and the bottom 33 of the basket is formed generally to the constraining cavity by crimping the excess corner material 34 at the fold region.

Figure 4:
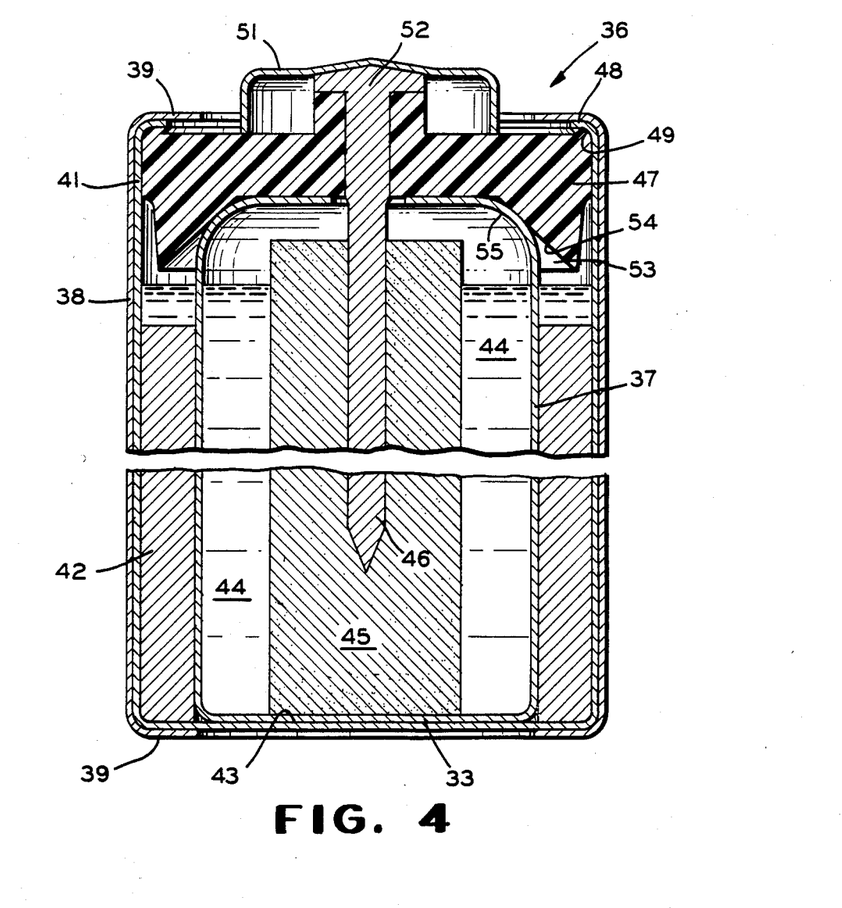
FIG. 4 is a sectioned elevational view of a primary cell of the type in which the separator basket of this invention is utilized.

A typical primary cell 36 to which the separator basket 37 formed as shown in FIG. 3 and mounted in accordance with the method and employing the apparatus of this invention is shown in FIG. 4. It comprises an outer insulator tube 38 having ends 39 formed over a can 41 which contains the cell elements. The can 41 and its elements are concentric and of right circular form in the example. A cathode 42 of a suitable composition, manganese dioxide, graphite, potassium hydroxide and binder in a thick paste form, for an exemplary alkaline cell, partially fills the can 41 in its lower portions as a hollow cylindrical body. Separator basket 37 is fitted within the hollow cathode with its closed end 33 abutting the inner face of can end 43 and its outer sides contiguous with the inner surface of cathode 42. Electrolyte 44, potassium hydroxide in the example, fills the space between the inner surface of the separator basket 37 and an anode cake 45 in which is embedded a collector or anode conductor 46.

Can 41 is closed at its upper end by a top 47 of insulating material which is resistant to the electrolyte and is sealed with the can walls by crimping the upper lip 48 of the can over a suitably radiused upper shoulder 49 of the top. Anode conductor 46 is in electrical communication with a conductive cap 51, advantageously by welding the cap to the headed portion 52 of anode conductor 46. Conductor 46 is secured in the cap 47 in sealed relationship therewith to prevent leakage of electrolyte. A frusto conical cavity 53 in the underside of top 47 has its inclined walls 54 engaged with the open end wall portion 55 of separator basket 37 and deflects those end portions inwardly from their right circular cylindrical form to a convergence around the central anode conductor 46 when the top is applied to the assembly.

In an exemplary embodiment of an alkaline cell such as a size AA cell the can 41 is of steel, the cathode 42 is a mixture of manganese dioxide, graphite, potassium hydroxide and a binder compressed to a hollow right circular cylinder, the separator is ionically permeable thermoplastic sheet of polypropylene felted fibers, the electrolyte 44 is potassium hydroxide, the anode cake 45 is powdered zinc mixed with mercury, potassium hydroxide and a gelling material, the anode conductor 46 is brass, the cap 51 is nickel plated steel, and the top closure 47 is nylon, typically duPont Zytell 101. It is to be appreciated that separator baskets of the general form disclosed can be made of other ionically permeable thermoplastic sheet materials and can be utilized in other forms and geometries of primary cells.

Separator baskets according to this invention can be formed from a coiled strip of sheet stock, which has a width twice the desired height of the basket, folded upon itself longitudinally along the longitudinal center of the strip. Such folded stock can be preformed and face-to-face bonded in spaced bands extending transverse of its length to form partially preformed baskets 23 as shown in FIG. 2 by means of apparatus as schematically illustrated in FIGS. 5, 6 and 7.

Figure 5:
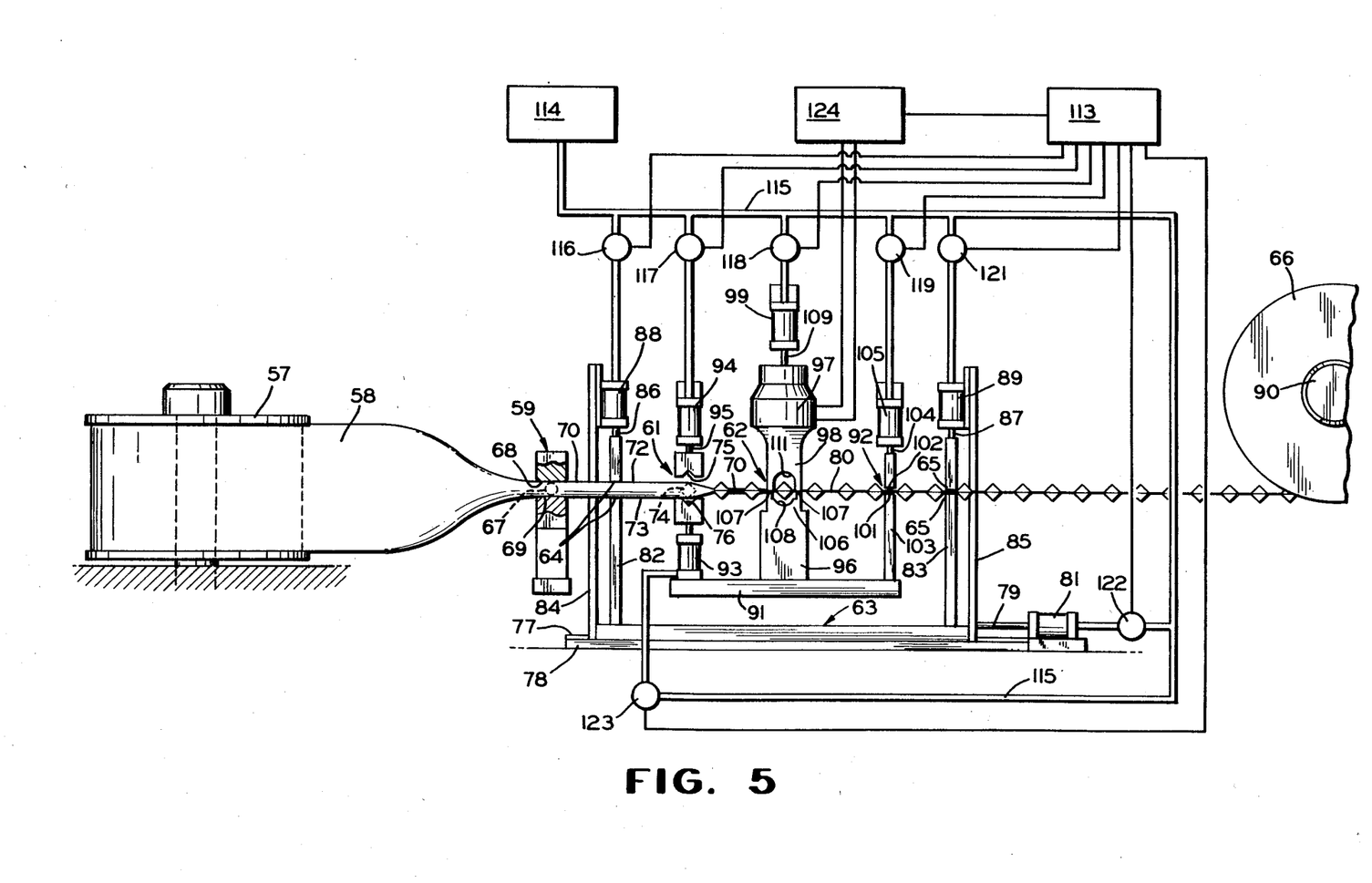
FIG. 5 is a schematic elevational view of one separator basket forming apparatus for folding, preform creasing, and bonding a separator basket preform as shown in FIG. 2 according to this invention; including a schematic electrical control system for a schematically shown pneumatic drive system.

A reel 57 for coiled separator sheet strip 58 is shown with its axis of rotation vertical in FIG. 5 Sheet strip 58 is drawn from reel 57 to a fold station 59, a creasing station 61 and a bonding station 62 by a reciprocating gripper slide 63 having sets of gripper jaws 64 between the fold station 59 and the creasing station 61 and gripper jaws 65 beyond the weld station 62. The partially preformed separator baskets in the illustrated system are maintained in a strip which is recoiled on a reel 66.

Strip 58 is carried over a folding mandrel 67 positioned between and spaced at least the strip material thickness from opposed folding blocks 68 and 69 having surfaces which engage the strip which are normal to the plane of the unfolded strip 58. As shown in detail in FIG. 7, strip 58 is confined by the folding station since the lower block 69 supports folding mandrel 67 as a cantilever from its upstanding arm and upper block 68 extends along the upper surface of the mandrel and across its end. In order to facilitate threading of the strip through the folding station, block 68 is removably secured to block 69 as by a screw. The longitudinal center of the strip is carried over the radiused end 71 of the folding mandrel so that upper 72 and lower 73 runs of strip 58 are wrapped over the mandrel and translated to a parallel relationship by the folding blocks 68 and 69. Advantageously the folded strip 70 is oriented with its upper and lower runs 72 and 73 parallel to the working planes of the subsequent strip processing stations. Gripper jaws 64 grip the longitudinally folded upper and lower runs 72 and 73 of strip 70 in superposed relation and with jaws 65 are reciprocated to the right as viewed in FIGS. 5 and 6 to advance an increment of folded strip 70 to a creaser mandrel 74 upon which upper and lower creaser jaws 75 and 76 close to crease the upper and lower runs 72 and 73. Mandrel 74 can be square with its cross-sectional diagonals parallel with and normal to the folded strip 70. Jaws 64, 65, 75 and 76 can be driven by any suitable means such as pneumatic cylinders controlled by solenoid actuated pneumatic valves sequenced with reciprocation of gripper slide 63 which can be similarly driven. As creaser jaws 75 and 76 close on mandrel 74 a crowned crease 29 and 31 is formed in each of the upper and lower runs 72 and 73 extending transverse of the length of those runs and outwardly from each other from the open side of the strip to a point approaching the fold 24.

Figure 6:
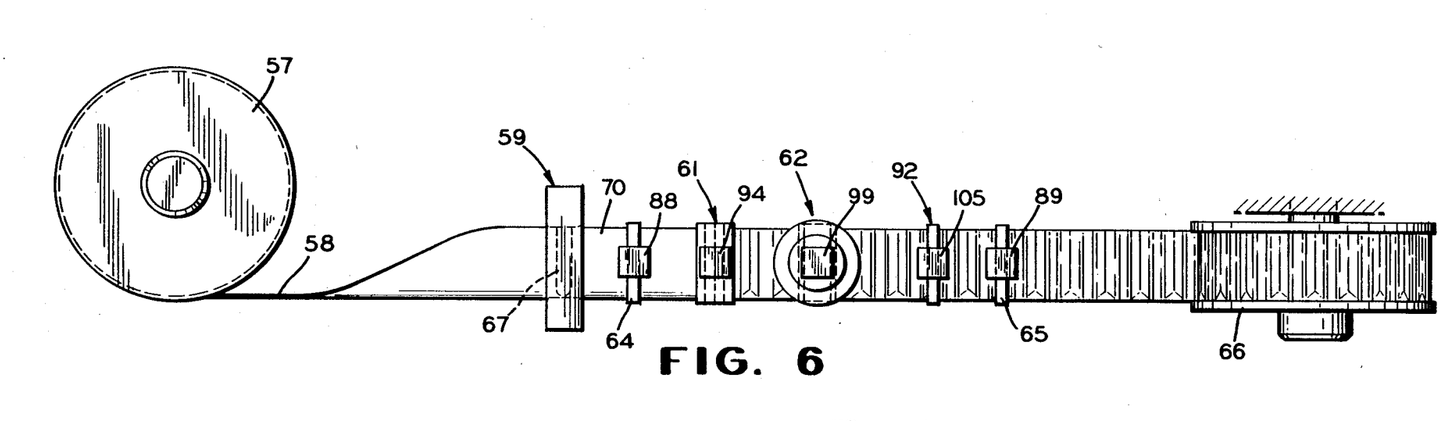
FIG. 6 is a plan view of the apparatus of FIG. 5 showing the folding of the separator sheet strip.
Figure 7:
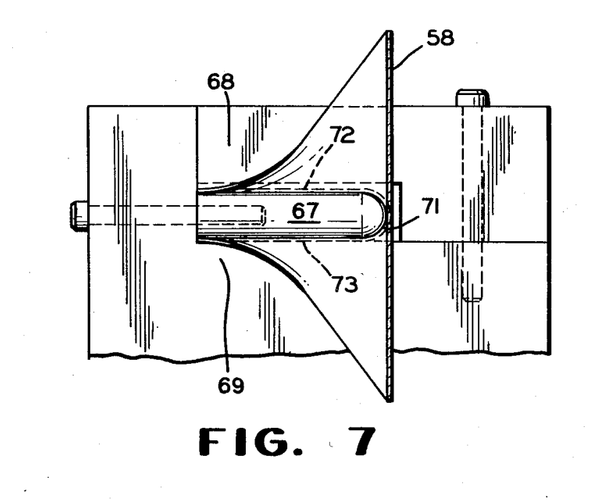
FIG. 7 is a sectioned view of the strip folding station taken at line 7—7 of FIG. 6.

The gripper slide 63 is shown schematically in FIG. 5 and only the gripper jaws and actuators are shown in FIG. 6. The slide 63 moves on rail 77 on bed 78 and is driven along those rails by piston rod 79 from pneumatic cylinder 81. Slide 63 carries lower jaws 64 and 65 on stanchions 82 and 83 and the actuators for upper jaws 64 and 65 on stanchions 84 and 85. Upper jaws 64 and 65 are carried on piston rods 86 and 87 extending from cylinders 88 and 89 secured to stanchions 84 annd 85.

A stationary base 91 supports creaser station 61, bonding station 62 and a holddown 92. The creaser stations support from base 91 is shown as lower jaw actuating cylinder 93. Upper jaw actuating cylinder 94 and the creaser mandrel 74 may be supported on a stanchion (not shown) from base 91 to maintain the alignment of jaw 75 on the rod 95 from cylinder 94 and the mandrel 74 with lower jaw 76. Creaser jaws are opened and closed on mandrel 76 by actuating cylinders 93 and 94 as will be described. Similarly, bonding station lower anvil is mounted on a stanchion 96 from base 91 and the horn 97 and upper anvil 98 are mounted for movement toward and away from the lower anvil by cylinder 99 mounted on a stanchion (not shown) from base 91. A holddown station has a stationary lower jaw 101 and a movable upper jaw 102 which enable the strip 70 to be held during release and retraction of gripper jaws 64 and 65. Lower jaw 101 is mounted on base 91 by stanchion 103. Upper jaw 102 is on piston rod 104 extending from cylinder 105 supported from base 91 by a stanchion (not shown).

The crowned creased areas of folded strip 70 are advanced to the bonding station 62 which is spaced from the creasing station 61 a multiple of advance increments so that the crowns 29 and 31 are centered in the bonding station. The bonding station is illustrated as an ultrasonic welder although a heated welder or an adhesive bonder might also be utilized. It includes an anvil having working surfaces 107 extending across strip 70 and longitudinally spaced along the strip the distance desired to define essentially one half the perimeter of the separator basket to be formed and defining the spacing of the bonds 27 and 28 between the upper and lower runs 72 and 73 of the strip 70. A cut out region 108 is provided between surfaces 107 to receive the crown 31 of the crease in lower run 73 without removing that crown during the bonding operation. The welding or bonding head upper anvil 98 is positioned above and in cooperative relation with anvil 106 and is arranged for vertical reciprocal motion by piston rod 109 from cylinder 99 coupled to transducer 97 to carry the welding faces of upper anvil 98 into compressed bonding engagement with the superimposed runs 72 and 73 as the creasing jaws are closed. Upper anvil 98 is bifurcated to support spaced faces and provide therebetween a relieved region 111 to accommodate the crown 29 of the upper run 72.

Figure 8:
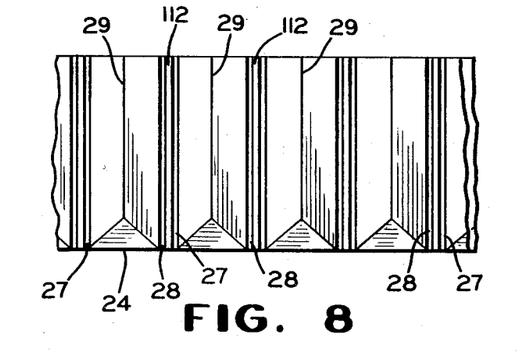
FIG. 8 is an enlarged plan view of a fragment of the creased and bonded strip of separator basket preforms as it is fed to the rewind station of FIGS. 5 and 6.
Figure 9:
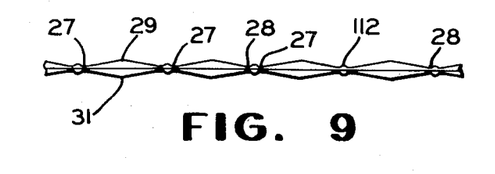
FIG. 9 is a side view of the strip of FIG. 8.

As the bonded strip 80 exits the bonding station 62 it appears as shown in FIGS. 8 and 9 as a series of joined partially preformed separator baskets 23 of the form shown in FIG. 2. It will be noted that the basket side bonds 27 and 28 are individual in the strip. That is, there is a short intermediate length 112 of the bonded strip 80 between the side bonds 27 and 28 of adjacent baskets. It is to be appreciated that the intermediate length 112 can be adjusted by the advance increment determined by the stroke of the gripper slide 63 and that such adjustment can be incorporated in the slide drive. In some applications it may be desirable to merge the bond 27 of one basket with the bond 28 of the succeeding basket and to sever the baskets from the strip at that region so that bond fins remain on each side of the cut.

The strip 80 with a series of partially preformed baskets can be rewound as on reel 66 having an axis of rotation parallel to the major surface of the strip. Reel 66 can be driven by a torque motor 90, or a constant tension drive, or the strip can be festooned and a periodic takeup drive actuated by some mechanism response to the amount of strip festooned. Alternatively, the strip can be severed transversely to produce individual baskets as shown in FIG. 2 at a shear station (not shown) to the right of the gripper jaws 65 as viewed in FIG. 5. Such a shear would be suitably spaced from the bonding station so that registration of the shear with intermediate length 112 or the contiguous bonds 27 and 28 is achieved or a registration control means (not shown) is provided to afford such shear registration.

Sequencing in the basket preformer of FIGS. 5, 6 and 7 is accomplished by conventional electronic controls such as a programmable controller 113 issuing signals to solenoids actuating drive cylinder control valves which maybe pneumatically driven. A supply of pressurized air 114 is conveyed by manifold 115 to the respective pneumatic valves 116 for cylinder 88, 117 for cylinder 94, 118 for cylinder 99, 119 for cylinder 105, 121 for cylinder 89, 122 for cylinder 81 and 123 for cylinder 93. Each of the valves has a feed conduit to its respective cylinder which can represent both advance and retraction feeds for the pistons therein. Each of the valves also has a control circuit for signals passed from the sequencer 113 represented by a single line. An initialized condition of the sequenced element finds the gripper slide 63 retracted toward the supply of sheet strip 58 and all of the gripper jaws 64 and 65, creaser jaws 75 and 76, welding head 98, the holddown 102 retracted.

The gripper jaws 64 and 65 are closed on sheet strip 70, which has been longitudinally folded along its longitudinal center line and has been threaded through the fold, creasing and bonding stations and between the gripper jaws, by actuating solenoid valve controlled cylinders 88 and 89. Then the gripper slide is advanced by actuating advance cylinder 81 while jaws 64 and 65 remain closed to advance the folded sheet strip 70 one separator basket increment. This draws an unfolded sheet strip portion into the fold station 59 to fold it for introduction into the creasing station 61.

Next the upper and lower creasing jaws 75 and 76 are closed upon a folded length of sheet strip 70 which has an upper run 72 above and a lower run 73 below creasing anvil 74 to crease the runs over the mandrel. Jaw closure is by advancing actuation of the solenoid valve control of cylinders 94 and 93 in response to signals from sequence control 113. Welding head 81 is advanced by a similar control of cylinder 99 and the ultrasonic driven energy source 124 for its transducer 97 is activated while welding faces 107 and upper anvil 98 engage the upper and lower runs of folded sheet strip 70 is welding relationship to form a pair of side welds embracing a ccreased portion of the sheet strip.

After the completion of the creases and bonds, welding energy is terminated to transducer 97 and welding head 98 is retracted to raise it from the bonded areas of the sheet strip 80 and free the strip for advance by suitable solenoid valve actuation of the drive cylinder 81. The strip 70 is also released at the creasing station 61 by the retraction of jaws 75 and 76 through solenoid valve actuation of cylinders 94 and 93.

The strip is held in its current position by activating holddown 92 through sequencer 113 signal activation of cylinder 105 while the gripper jaws 64 and 65 are retracted from the strip by cylinders 88 and 89 in response to signals from sequencer 113 to disengage the advanced slide 63 from the strip. Gripper slide cylinder 81 is activated by signals from sequencer 113 to retract the slide toward the source of sheet strip 58. After being retracted by slide 63 to a position to grasp a new separator basket increment of folded sheet strip 70, the gripper jaws 64 and 65 are closed by cylinders 88 and 89 in response to signals from sequencer 113 to engage the new increment. That new increment and those portions of sheet strip 70 in advance thereof including the creased regions and the bonded regions are all advanced one separator basket increment by the advance of the slide 63 through sequencer activation of gripper slide cylinder 81 while the jaws 64 and 65 remain closed all under control of the sequencer 113.

Thus the sequencer 113 controls the apparatus which causes strip to be advanced, folded, creased and bonded. It can also activate a shear (not shown) which, as in the shear to be discussed with reference to FIGS. 10, 11 and 12, can be registered with the separator basket edge bonds to shear the strip so that basket preforms having bonds transverse of the strip on each side of the creased region of the preforms are separated from the strip. Advantageously the shear would be activated during the creasing and welding operations while the gripper holds the strip in proper position.

Such partially preformed baskets can be manually formed and inserted into primary cell assemblies as by the insertion of a mandrel (not shown) into the basket end which is partially open due to crimping of the major faces of the sheet strip. Where the basket is to be of a right circular cylindrical form, the mandrel can expand the basket to that form where it is a circular cylinder of an outer diameter approaching the internal diameter of the cathode cylinder 42. Also the mandrel with the separator basket thereon can be inserted into a forming tool (not shown) to fold the finned bond regions of the basket wall against the outer wall of the separator basket. Where a cathode cylinder has been formed within a primary cell casing as shown in FIG. 4, the mandrel with the separator basket thereon can also be inserted into the cathode-can assembly so that the nose or lead end of the mandrel over which the closed basket end is fitted forms that basket end to the can bottom.

As shown in FIGS. 5 and 6 the partially preformed separator baskets are maintained in the sheet strip and are rewound on reel 66. The sequencer can periodically activate the drive 90 of reel 66 to take up increments which have been processed in the apparatus.

Figure 10:
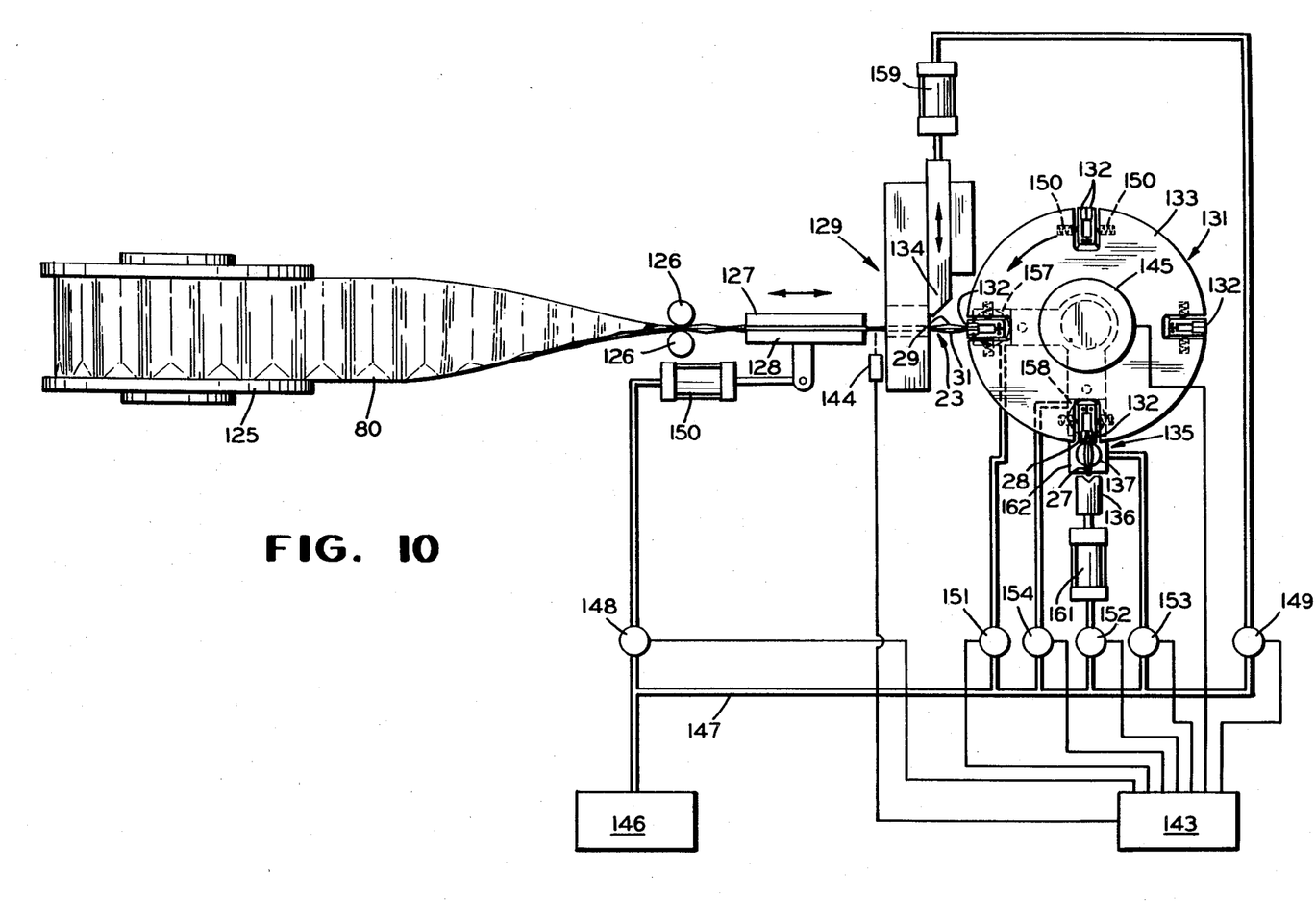
FIG. 10 is a schematic plan view of portions of the apparatus for further forming of a separator basket which includes means for opening the basket preform to facilitate the insertion of the separator basket in a cathode half cell of the primary cell of FIG. 4 and including a schematic electrical control system for a schematically shown pneumatic drive system.
Figures 11, 12, 13:
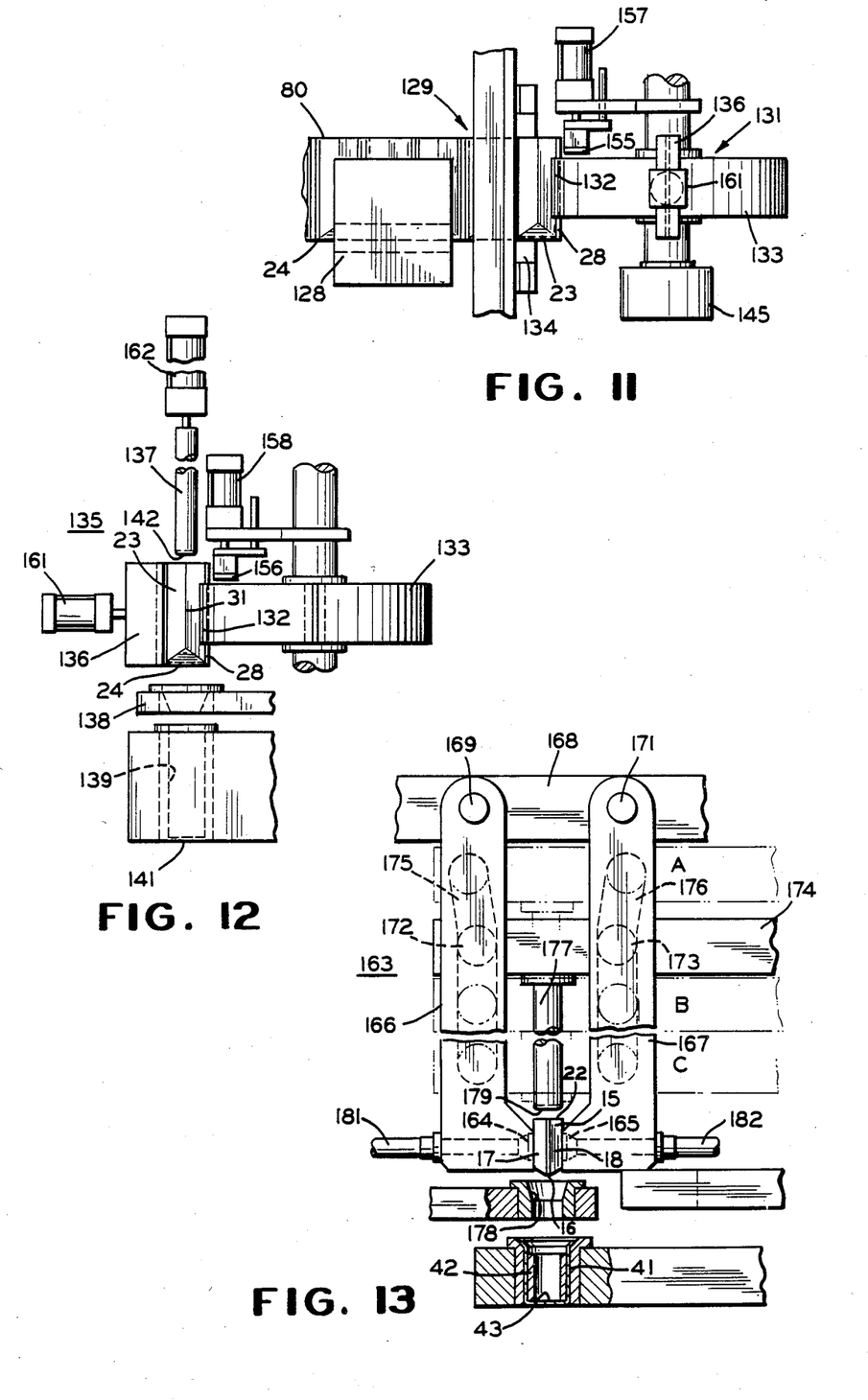
FIG. 11 is a elevational view of the apparatus of FIG. 10 showing the means to open jaws which grip the basket preform leading edge.
FIG. 12 is an old view from the right hand end of the apparatus of FIG. 10 showing fragmentary portions of a forming mandrel, basket preform release, forming tool, and receiving cavity for the separator basket loading means for a cell of the type shown in FIG. 4.
FIG. 13 is a schematic elevational view of an alternative separator basket forming and loading apparatus illustrating certain of the steps of formation and loading of the basket.

Completion of the forming of the separator baskets preformed as in FIGS. 2, 8 and 9 is accomplished as shown in FIGS. 10, 11 and 12 by spreading the adjacent walls of the basket preform 23, inserting a forming mandrel into the open end of the basket preform severing the basket preform from the strip, advancing the severed basket preform with the mandrel therein through a forming tool which folds the fin like edge bonds along the basket side, and passing the basket preform with the mandrel therein into a cavity and against an end wall of the cavity to form the end to the cavity configuration. The equipment of FIGS. 10, 11 and 12 performs these forming and insertion steps on the separator baskets of the type shown in FIGS. 2, 8 and 9 as derived from a supply reel 125 which may be the takeup reel 66 of FIGS. 5 and 6.

The reel 125 is shown oriented to accommodate other cell assembly equipment (not shown) on a spatial basis and therefore is mounted on a horizontal axis. Separator basket strip 80 is twisted ninety degrees to pass between feed rolls 126 to a reciprocating feeder having grippers 127 and 128 which grip the strip edge at the basket bottom folds 24 and advance the strip to shear station 129 and forming insertion unit 131. Jaws 132 on a turrent 133 receive and grip the bond fin 28 at the leading end of strip 80 and the shear blade 134 is reciprocated to separate the lead basket preform 23 from the strip 80. Turret 133 rotates ninety degrees counterclockwise as viewed in FIG. 10 to carry the partially preformed basket to an insertion station 135 of forming-insertion unit 131 where the crowns 29 and 31 of each crease are further separated by a grooved tool 136 which pushes the fin 27 of the bakset opposite that gripped by jaws 132 while an insertion mandrel 137 is advanced into the basket open end to spread its faces toward a right circular cylindrical form. The gripped fin 28 is released by jaws 132 and the insertion mandrel advances the basket into and through a forming tool 138 which causes the bond fins 27 and 28 to flatten against the basket sides. The basket is further advanced into a cavity 139 having a bottom 141 so that it seats and its bottom is crimped between the bottom 141 and the forming mandrel tip 142 to compress it into general confirmation therewith.

Sequencing of the final forming and insertion apparatus of FIGS. 10, 11 and 12 can also be accomplished by a programmable controller sequencer 143 which issues electrical signals and, where registration of work pieces is automatic, receives and responds to registration signals read from the strip 80. An optical reader 144 can be provided to pickup indicia on the strip 80 positioned to provide an accurate reference from which the strip relationship to the shear 134 can be established. Such a indicia pickup can issue signal impulses to advance or retard the strip feed of the reciprocating grippers 127 and 128 while they are feeding an increment of strip 80 to the shear station 129.

Sequencer 143 issues, electrical signals, in an appropriate timing order, as will be described to cause the rotation of turret 133 by a motor 145 and the advance and retraction of actuating rods from cylinders supplied pressurized air from a source 146 through manifold 147 and sequencer controlled pneumatic valves. Such electrically controlled valves include a feed control 148, a shear control 149, a jar opener control 151, a grooved tool advance control 152, an insertion mandrel control 153, and a jaw opener control 154. These control valves can be of a complex form to control not only advance and retraction strokes but also stepped degrees of advance and thus can be multiple valving means which are shown as single valves for purposes of illustration of the control of the apparatus. For example, if a means to index the strip 80 of separator basket preforms is arranged to be automatically indexed as by means of a reader 144 providing advance or retard signals to the controller 143, the stroke of the feed piston in feed cylinder 150 may be adjusted (by means not shown) under control of the advance of retard signal issued by controller 143. Such adjustment means is represented by feeder control valve 148. Similarly, the insertion mandrel may be provided with a stepped advance such that the first advance introduces the mandrel 137 into the basket preform 23 so that its end 142 approaches the basket preform bottom 24 which the preform is gripped by jaws 132. After the jaws 132 have released the preform, the mandrel is advanced further to complete the insertion of the preform into its receiving cavity. Thus a two step stroke control is provided which is represented in the schematic drawings as insertion mandrel control valve 153 although it may involve several valves.

The jaws 132 on turret 133 are fulcrumed on each other and are spring biased toward a closed position. They are provided with cam surfaces which cooperate with reciprocating cams 155 and 156 respectively at the shear station 129 and the insertion station 135 such that the advance of the reciprocating cams parallel to the axis of rotation of turret 133, spreads the jaws and the retraction of those cams from the jaws permits the jaws to be closed by their biasing springs 150. Solenoid controlled valves 151 and 154 control air to cylinders 157 and 158 to advance cams which drive the jaw cams between a jaw opening and a jaw closing state at the shear station 129 and the insertion station 135 respectively. At the shear station cylinder 157 advances its cam 155 to open jaws 132 which are aligned with cam 155 to receive the leading bond fin 28 of the separator basket 23 to be sheared from strip 80. After the bond fin is positioned between the jaws 132, cylinder 157 withdraws its cam 155 to close those jaws on the fin 28. Shear 134 is operated by a signal from sequence 143 to valve 149 which causes cylinder 159 to move blade 134 downward to sever the lead preform 23 from strip 80 and thereafter to retract the shear so that the new lead preform 23 can be advanced into the open jaws 132 in the next adjacent quadrant of turret 133 when it has been indexed. The turret 133 is then rotated by drive 145 to carry the separator basket 23 to the insertion station 135 and bring a vacant pair of jaws 132 into the shear station 129. The grooved spreading tool 136 is advanced by cylinder 161 toward the turret axis to advance the free bond fin 27 of basket preform 23 toward that fin 28 gripped by jaw 132. This causes the crowns 29 and 31 to flex outward and open the basket to receive insertion mandrel 137 which is advanced under control of valve 153 by cylinder 162 into the basket. With the insertion mandrel in the basket, jaws 132 release the bond fin 28 in response to the activation by sequencer 143 through valve 154 of cylinder 158 to advance its cam 156 between the jaws. The insertion mandrel is then further advanced by cylinder 162 through forming tool 138 and into cavity 139 carrying the separator basket 23 with it. Upon seating of the closed basket end 24 in cavity 139 against end wall 141 insertion mandrel 137 is withdrawn by cylinder 162 under control of sequencer 143 and valve 153 and when clear of the turret, the turret is rotated by sequencer control of drive 145 to bring the next following basket to the insertion station 135 while leaving the shear station 129 clear to receive a bond fin 28 of a lead basket 23 on strip 80 to initiate another forming-insertion cycle. The sequencer is arranged to cause the overlap in time of the above described functions at the shear station 129 and the insertion station 135 such that the strip 80 is advanced, its lead basket preform 23 is gripped by jaws 132 and is sheared from the strip 80 while the next preceding preform 23 is being opened, having the insertion mandrel 137 inserted, being released by jaws 132, advanced into its receiving cavity 139 and its mandrel withdrawn to clear the insertion station for advance of the sheared and gripped preform from the shearing station.

Alternative forming-insertion techniques can be employed by forming the separator basket as illustrated in FIG. 1 with no creased crowns and by processing strips of such separator baskets in apparatus of the type shown in FIG. 13 wherein the opposite major sides of the folded and transversely bonded strip are separated by subjecting them to a vacuum applied by vacuum cups at the ends of pivoted arms and pivoting those arms apart to open the basket for reception of an insertion mandrel.

The forming-insertion station 163 of FIG. 13 operates on a strip of basket preforms 15 of the type illustrated in FIG. 1, only the end of which is shown in FIG. 13. Such strips can be formed in apparatus of the type shown in FIGS. 5, 6 and 7 from which the crimping station 61 has been removed or rendered inoperative. The resulting strip of basket separators 15 is rolled onto a reel, as 66, for storage until further processed. Basket separator strips 80 can be fed to the apparatus shown in FIG. 13 by elements such as supply reel 125, feed rolls 126 and grippers 127 and 128 with their associated reciprocating drive 150 and control 148 and sequencer 143, none of which is shown in FIG. 13. These feed elements can be arranged behind the structure of FIG. 13 so that they advance the leading end of strip between the faces of vacuum cups 164 and 165 in an orientation such that the open end or side 22 of each basket 15 is presented to an adjacent insertion mandrel 177 corresponding in function and form to mandrel 137 of FIGS. 10 and 12 and the closed end fold 16 of each basket 15 is spaced from mandrel 177 and is adjacent a forming tool 178 corresponding to forming tool 138 of FIGS. 10 and 12.

As shown in FIG. 13 the vacuum cups 164 and 165 are mounted on arms 166 and 167 which are pivoted on a fixed header 168 at 169 and 171. The lower free ends of arms 166 and 167 are moved toward and away from each other by means of cams 172 and 173 carried on crosshead 174 and traveling in cam tracks 175 and 176 in arms 166 and 167 respectively. Crosshead 174 carries insertion-mandrel 177 centered between arms 166 and 167 and arranged for insertion into an open basket preform 15 and for insertion of that preform into forming tool 178 and from there into a receiving cavity while on the mandrel.

Crosshead 174 is moved through a path parallel to the longitudinal axis of mandrel 177. Since preform 15, forming tool 178 and the receiving cavity are axially aligned with the longitudinal axis of the mandrel 177, the path of motion of the crosshead 174 mechanically synchronizes motion of the vacuum cups 164 and 165 and the mandrel 177 to open the preform 15, introduce the mandrel into the preform and carry the preform into its receiving cavity. Four positions of the crosshead are utilized in performing these functions. The initial open position of the vacuum cups with the mandrel end 179 free of the strip receiving region of the insertion station is shown in FIG. 13 in full lines. Phantom positions of the crosshead only are shown to illustrate operations at the insertion station, those positions being designed "A" for full closing the vacuum cups on each other, "B" for the insertion of the mandrel into the preform, and "C" for the insertion of the preform through the forming tool 178 and into the hollow cathode cylinder 42 and against the bottom 43 of battery case cup 41.

Initially the arms are spread to separate the vacuum cups 164 and 165 and no vacuum is applied. The first basket preform 15 of the strip is advanced between the cups with its unsealed end facing mandrel end 179.

The sequencing control actuates the drive for crosshead 174 to raise it to position A thereby closing vacuum cups 164 and 165 onto the flat or unopened sides of lead basket preform 15. Immediately adjacent and behind vacuum cups 164 and 165 is a shear station (not shown) corresponding to shear station 129 of FIGS. 10 and 11 arranged to sever individual separator basket preforms 15 from the strip at the space between preforms corresponding to space 112 of FIGS. 8 and 9 between the bonded sides or fins 19 and 21 of adjacent baskets in the strip. Lead basket preform 15 is severed from the strip by actuation of the shear and vacuum is applied to the vacuum cups to draw the opposite faces 17 and 18 against respective cups 164 and 165 by the sequencing control. Next the arms 166 and 167 are pivoted apart by lowering the crosshead 174 to separate the vacuum cups 164 and 165 and open the upper end of basket preform 15 as shown in full lines in FIG. 13 under control of the sequencing control and the crosshead drive. The sequencing control causes the crosshead 174 to be lowered to position B while vacuum is maintained so that mandrel 177 enters the open upper end of preform 15 and advances to locate mandrel end 179 near the bottom fold 16 of the preform while the vacuum holds the preform. Then vacuum is removed from the vacuum cups 164 and 165 by operation of the sequencer on valving (not shown) in vacuum conduits 181 and 182 between the cups and a suitable vacuum source. It should be noted that fold 16 is below the lower portion of the lips of vacuum cups 164 and 165 so that upon separation of the cups the separator material at the fold and forming the bottom is not ruptured and the gripping vacuum of the cups is not broken.

The sequence control permits the further advance of the forming mandrel 177 by advancing crosshead 174 to position C to carry the mandrel and separator basket preform into and through forming tool 178 and into a cavity beyond the forming tool in which the separator basket bottom end 33 is formed by crimping between the end 179 of the forming mandrel and the cavity wall, can bottom 43. In practice the cavity can be a primary cell subassembly such as a cell casing 41 containing a cathode preform 42 which is of annular form as illustrated in FIG. 4 so that the separator is inserted into the cathode annular cavity and its bottom is crimped against the inner face 43 of the can end.

The sequence control next activates the withdraw of the forming mandrel leaving the separator within the cell subassembly, advances the cell subassembly with the installed separator from a position in registry with the forming tool 178 and conditions the apparatus for a repetition of the separator forming and insertion cycle described above by causing a new cell subassembly to be placed in registry with tool 178 and a new increment of the separator basket preform strip to be positioned between the separated vacuum cups 164 and 165.

It is to be appreciated that the separator basket and its methods of forming and insertion can be employed with other than alkaline cells and can form basket geometries other than the right circular cylindrical form illustrated. For example, elliptical for rectangular cylinders can be formed where cell design dictates such forms. While it is advantageous to employ a material which lends itself to ultrasonic welding, alternative bonding techniques can form the side seams transverse of the longitudinally folded separator sheet material. That material can be multi-layered and of various thicknesses depending upon the cell structure desired. Further, the formation of cylinders from the preforms can be accomplished by other than the techniques and apparatus shown as, for example, by the manual opening of the preform and insertion of a forming mandrel into the preform.

The process and apparatus can be modified to employ prefolded strip separator material. Preforms can be opened and forming mandrels inserted before they are severed from the strip in which they are formed. Alternative forms of gripping mechanisms and transfer mechanisms can be utilized in the practice of the process and assembly of the mechanisms for the apparatus. Thus the above description is intended to be illustrative of the invention and is not to be read in a limiting sense.

What is claimed is:

1. Apparatus for manufacturing a plurality of primary cell separator basket preforms comprising folding means for a strip of separator sheet material, the strip having parallel longitudinal edges and being of a width at least twice the height of the separator basket, said folding means folding the strip longitudinally and parallel to the edges of the strip with the width of the narrowest side of the strip contiguous to the fold at least the height of the separator basket and the length of the strip and the fold greater than a plurality of preform widths of length exceeding one half the perimeter of the separator basket, the folded strip having overlaying strip sides, said folding means including a folding mandrel normal to the path of the plane of the strip and having opposed longitudinal sides and guides closely spaced from said mandrel sides for confining the folded strip panels against the opposed longitudinal mandrel sides; first and second spaced strip clamps mounted for joint reciprocal motion along the path of the folded strip and arranged to grip selectively the outer faces of the strip; reciprocal drive means for said first and second strip clamps; means to actuate said clamps to grip strip and to actuate said reciprocal drive while said clamps grip the strip; and joining means to join the overlaying sides of the folded strip at a plurality of paired bond regions spaced apart generally one half the perimeter of the separator basket and extending continuously from the fold toward and normal to the longitudinal edges of the strip, the paired bonds being spaced along the strip to define preforms having basket bottoms at the fold, an open basket top opposite the fold and closed basket sides between the paired bonds; said reciprocal drive advancing said strip in increments of a length exceeding one half the perimeter of the separator basket plus the width of the paired bond regions longitudinally of the strip and said second clamp being spaced from said joining means downstream of the strip path a multiple of said increments whereby said second clamp grips said strip between basket preforms defined by closed preform walls between paired bonds of the strip.

2. Apparatus according to claim 1 including shear means to shear the bonded strip between closed preform walls between paired bonds.

3. Apparatus for manufacturing a plurality of primary cell separator basket preforms comprising folding means for a strip of separator sheet material, the strip having parallel longitudinal edges and being of a width at least twice the height of the separator basket, said folding means folding the strip longitudinally and parallel to the edges of the strip with the width of the narrowest side of the strip contiguous to the fold at least the height of the separator basket and the length of the strip and the fold greater than a plurality of preform widths of length exceeding one half the perimeter of the separator basket, the folded strip having overlaying strip sides, creasing means for creasing a crown on one of the strip sides at the closed basket sides between paired bonds; and joining means to join the overlaying sides of the folded strip at a plurality of paired bond regions spaced apart generally one half the perimeter of the separator basket and extending continuously from the fold toward and normal to the longitudinal edges of the strip, the paired bonds being spaced along the strip to define preforms having basket bottoms at the fold, an open basket top opposite the fold and closed basket sides between the paired bonds.

4. Apparatus according to claim 3 wherein said creasing means creases a crown on each of the strip sides at the closed basket sides between paired bonds.

5. Apparatus according to claim 4 wherein said creasing means is a mandrel adapted to be positioned between the overlaying strip sides; a pair of jaws conforming to said mandrel; and means to close said jaws on said mandrel and the overlaying strip sides.

6. Apparatus according to claim 3 wherein said joining means is an ultrasonic welder having a bifurcated head with paired welding surfaces spaced apart generally one half the perimeter of the seprator basket and having a relieved region between said paired welding surfaces to provide clearance for the creased crown; and wherein the creasing means is applied to the strip side prior to the joining means.

7. Apparatus according to claim 3 including strip advancing means to advance the strip longitudinally in step-by-step increments of a length exceeding one half the perimeter of the separator basket plus the width of the paired bond regions to advance the strip to said folding means; and wherein said creasing means and said joining means are spaced longitudinally of the strip a given number of advance increments.

8. Apparatus according to claim 7 including shear means to shear the bonded strip between closed preform walls between paired bonds downstream of said creasing and joining means along the path of strip advance.

9. Apparatus for manufacturing a plurality of primary cell separator basket preforms comprising folding means for a strip of separator sheet material, the strip having parallel longitudinal edges and being of a width at least twice the height of the separator basket, said folding means folding the strip longitudinally and parallel to the edges of the strip with the width of the narrowest side of the strip contiguous to the fold at least the height of the separator basket and the length of the strip and the fold greater than a plurality of preform widths of length exceeding one half the perimeter of the separator basket, the folded strip having overlaying strip sides; a slide reciprocable parallel to the length of the strip; strip securing means for selectively engaging the strip mounted on said slide to move the strip with the slide in an advancing direction and release the strip while the slide retreats; a stationary strip hold down means for selectively securing the strip while the slide retreats and releasing the strip while the slide advances; and joining means to join the overlaying sides of the folded strip at a plurality of paired bond regions spaced apart generally one half the perimeter of the separator basket and extending continuously from the fold toward and normal to the longitudinal edges of the strip, the paired bonds being spaced along the strip to define preforms having basket bottoms at the fold, an open basket top opposite the fold and closed basket sides between the paired bonds.

10. Apparatus for manufacturing a plurality of primary cell separator basket preforms comprising folding means for a strip of separator sheet material, the strip having parallel longitudinal edges and being of a width at least twice the height of the separator basket, said folding means folding the strip longitudinally and parallel to the edges of the strip with the width of the narrowest side of the strip contiguous to the fold at least the height of the separator basket and the length of the strip and the fold greater than a plurality of preform widths of length exceeding one half the perimeter of the separator basket, the folded strip having overlaying strip sides; joining means to join the overlaying sides of the folded strip at a plurality of paired bond regions spaced apart generally one half the perimeter of the separator basket and extending continuously from the fold toward and normal to the longitudinal edges of the strip, the paired bonds being spaced along the strip to define preforms having basket bottoms at the fold, an open basket top opposite the fold and basket sides between the paired bonds; means to separate overlaying walls and the open basket top of the lead separator preform of the strip; a forming mandrel of the general shape of a separator basket; and means to advance said forming mandrel into the open basket top of the lead separator preform while the overlaying walls are separated by said means to separate.

11. Apparatus according to claim 10 including means to sever the lead separator preform from the strip after the advance of said forming mandrel.

12. Apparatus according to claim 11 including a support for holding a primary cell subassembly having a cavity adapted to receive a separator basket; and means to advance a severed separator preform containing said forming mandrel into the cavity of a subassembly held by said support.

13. Apparatus for manufacturing a plurality of primary cell separator basket preforms comprising folding means for a strip of separator sheet material, the strip having parallel longitudinal edges and being of a width at least twice the height of the separator basket, said folding means folding the strip longitudinally and parallel to the edges of the strip with the width of the narrowest side of the strip contiguous to the fold at least the height of the separator basket and the length of the strip and the fold greater than a plurality of preform widths of length exceeding one half the perimeter of the separator basket, the folded strip having overlaying strip sides; joining means to join the overlaying sides of the folded strip at a plurality of paired bond regions spaced apart generally one half the perimeter of the separator basket and extending continuously from the fold toward and normal to the longitudinal edges of the strip, the paired bonds being spaced along the strip to define preforms having basket bottoms at the fold, an open basket top opposite the fold and closed basket sides between the paired bonds; means to separate the overlaying walls and the open basket top of the leading preform; a forming mandrel of the general shape of a separator basket; and means to advance said forming mandrel into the open basket top of the lead separator preform while the overlaying walls are separated by said means to separate.

14. Apparatus according to claim 13 wherein the separator basket preforms have a crease in at least one of the walls between the bonded margins and outstanding from its overlaying wall, and wherein said means to separate the overlaying walls is means to displace said margins toward each other by compression whereby said crease bows outwardly from the overlaying wall.

15. Apparatus according to claim 13 including means for holding a primary cell subassembly having a cavity adapted to receive a separator basket; and means to advance a severed separator preform containing said forming mandrel into the cavity of a subassembly held by said support.

16. Apparatus for opening a primary battery separator basket preform having overlaying generally flat sidewalls joined at a pair of opposed margins spaced about one half the perimeter of the basket and having a crease in at least one of the walls between the bonded margins and outstanding from its overlaying wall comprising means to engage each of the pair of opposed margins; and means to advance said means to engage toward each other while said opposed margins are engaged whereby the wall having the crease is bowed outward from its overlaying wall.

17. Apparatus according to claim 16 wherein said means to engage one of said margins has walls converging in a V shape adapted to receive the one margin.

18. Apparatus for manufacturing a primary cell separator basket comprising a mounting means for a strip of separator sheet material, a pair of folding blocks having parallel adjacent work surfaces arranged to receive strip from said mounting means; a folding mandrel between said folding blocks and spaced therefrom to pass and to contain portions of the strip between each of said blocks and said mandrel, a crimping mandrel arranged to receive the folded strip with a first side of said strip on one side of said crimping mandrel and a second side of the strip spaced from said first side by the fold on the opposite side of said crimping mandrel, said crimping mandrel having a square cross section and extending transverse of said folded strip; a pair of crimping jaws mating with said crimping mandrel; means to open and close said crimping jaws on said crimping mandrel to crimp registering transverse ridges in the first and second sides of the folded strip; a welding anvil; a welding head cooperating with said welding anvil; means to move said welding head toward and away from said welding anvil; said welding head and said welding anvil being positioned to receive the crimped strip from said crimping jaws and having paired, cooperating working surfaces spaced from each other along the length of said strip approximately one half the perimeter of the cross section of the separator basket, said welding head and said welding anvil surfaces being relieved between said paired working surfaces to receive and accommodate said transverse ridges in the first and second sides of the strip; means to apply welding energy to said welding head; means to advance said folded strip step-by-step by increments at least equal to the spacing of said working surfaces and the width of said welding head working surfaces and means to maintain the step-by-step advance of said folded strip transverse ridges in alignment with said relieved surfaces during application of welding energy to the first and second strip sides therebetween to form spaced paired bonds on opposed edges of a separator basket preform.

19. A combination according to claim 18 including a magazine to accumulate the folded and welded strip.

20. A combination according to claim 18 including a turret aligned with the end of the welded strip; jaws at spaced positions around said turret adapted to grip the free end of said strip; a shear for severing a separator basket preform from said strip transverse of its length between successive paired bonds on the edges of the preforms while said jaws grip said strip; means to index said turret to advance said severed preform to a separation and inserting station; means to compress said preform in a direction normal to the plane defined by the registering transverse crimped ridges in the first and second sides of the folded strip to further separate said first and second sides; a forming mandrel aligned with the separate first and second sides of the folded strip; means to advance said forming mandrel into said preform while said preform is gripped by said jaws in the separation and insertion station; means to release said jaws from said preform; a forming tool axially aligned with said forming mandrel and having an aperture of the form of and equal to or slightly less than the cross section of a primary cell subassembly cavity adapted to receive the separator basket; a support means for a primary cell subassembly with a cavity adapted to receive the separator basket at the separation and insertion station and coaxial with the forming mandrel and forming tool; and means to advance said forming mandrel with the separator preform thereon through said forming tool and into the primary cell subassembly cavity in said support means.

* * * * *